April 20, 1926.
J. C. TOWLER
ATTACHMENT FOR BEAN CUTTERS
Filed Sept. 29, 1924
1,581,555
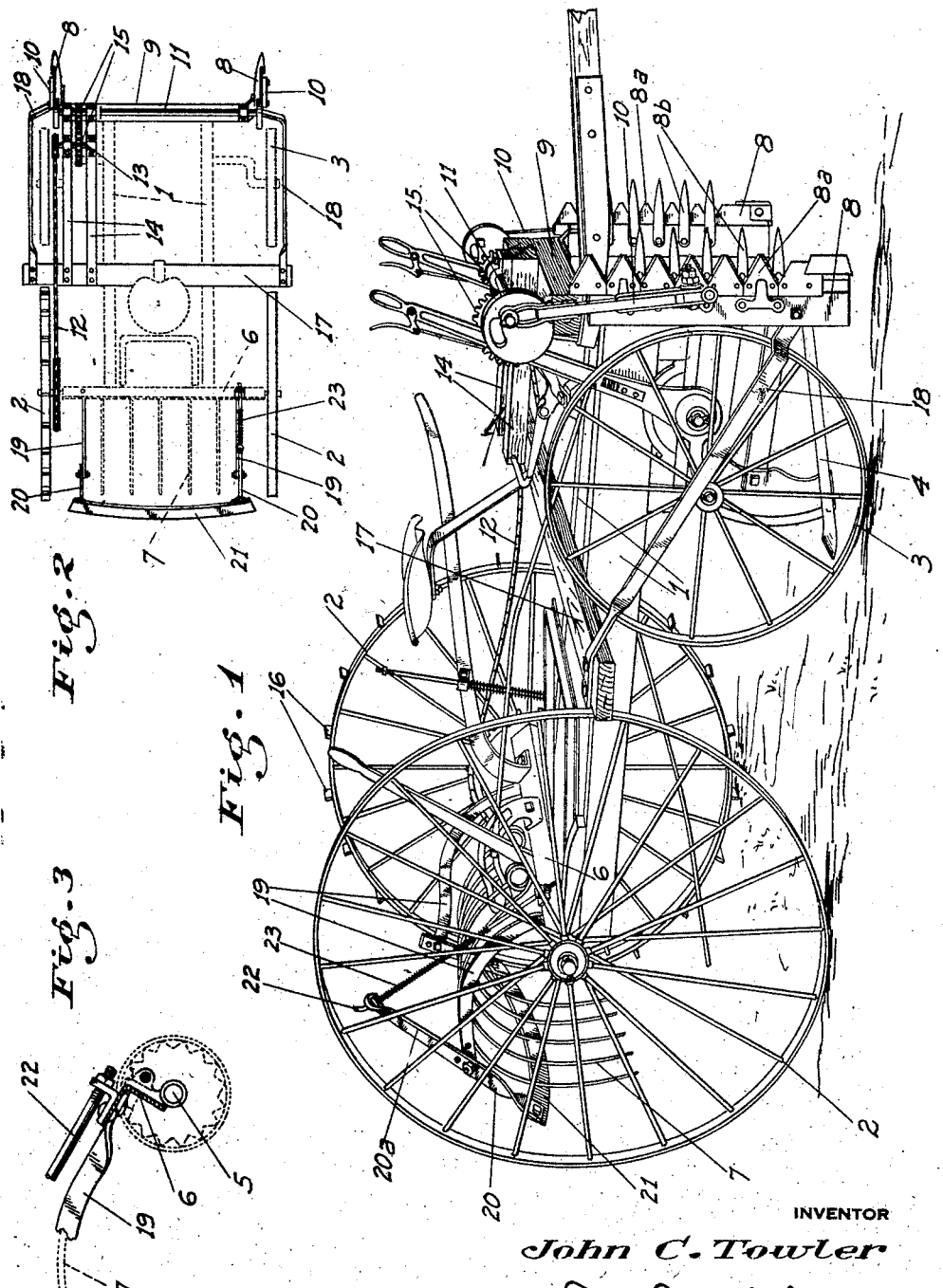
INVENTOR
John C. Towler
BY
ATTORNEY Patented Apr. 20, 1926.

1,581,555

UNITED STATES PATENT OFFICE.

JOHN C. TOWLER, OF HUGHSON, CALIFORNIA.

ATTACHMENT FOR BEAN CUTTERS.

Application filed September 29, 1924. Serial No. 740,485.

*To all whom it may concern:*

Be it known that I, JOHN C. TOWLER, a citizen of the United States, residing at Hughson, county of Stanislaus, State of California, have invented certain new and useful Improvements in Attachments for Bean Cutters; and I do declare the following to be a full, true, and exact description of the same, reference being had to the accompanying drawings, and to the characters of reference marked thereon, which form a part of this application.

This invention relates to improvements in agricultural machinery, and particularly to bean harvesting implements.

The principal object of my invention is to provide a device, arranged in the form of an attachment which may be applied to ordinary bean cutters of various makes, which will sever the vines of the different rows from each other ahead of the regular horizontal vine cutting members. This enables the cutting operations to be very expeditiously carried out, since it eliminates the tangling up and dragging along of the matted vines which with ordinary cutters causes a loss of time, since cutting operations must frequently be halted in order to cut and disentangle the vines of the different rows from each other and from the machine.

Another object is to provide a means, operable in conjunction with the stacking rakes used on certain bean harvesting machines, for insuring that the vines of each pile as they are gathered up by the rakes, will be positively severed from the vines of adjacent piles. This feature also expedites the vine handling operations, since the piles are no longer attached to each other by connecting vines which causes piles already made to be deranged by subsequent raking operations, or when the piles are being loaded into wagons or the like.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of a bean cutter showing my improved attachments thereon.

Fig. 2 is a top plan outline of the attachments on the cutter.

Fig. 3 is a fragmentary sectional view showing the mounting of the rear end or horizontal cutter supporting means.

Referring now more particularly to the character of reference on the drawings, the bean cutting machine to which I apply my attachments comprises longitudinal and transversely spaced main frames 1 supported at their rear ends on wheels 2 and at their front ends by steerable wheels 3, the structure being adapted to be drawn by horses or other draft means.

Depending from the frames 1 adjacent and between the front wheels is the horizontal cutter 4 of the machine, of any suitable character. Turnably mounted on the axles 5 of the rear wheels 2 is a transverse beam 6 to which are attached the rake teeth 7, which teeth are adapted to move to lie adjacent the ground or to be raised therefrom as shown. Any suitable control means such as the combined automatic and hand actuated mechanism common to such rake structures, is provided for controlling such movement, which however forms no part of my invention.

All the parts above described are common to a certain standard form of bean cutter now on the market, and are merely set forth here as showing the foundation to which my attachments may be applied without altering the construction or functioning of the standard machine.

My attachment for severing the vines of adjacent rows from each other comprises transversely spaced and vertically disposed sickle-bar or mower elements 8, of the same construction as is found on all agricultural mowers, but of shorter length and include as usual reciprocatable cutter blades 8$^a$ cooperating with stationary cutters and guard fingers 8$^b$. These elements depend and are supported from a transverse beam 9 mounted on the main frame beams 1 at the forward ends thereof. The blades 8ª are driven in unison by means of pitmans 10 themselves driven from a transverse shaft 11 rigidly mounted on the beam 9.

The shaft 11 is driven from one of the rear wheels 2 by means of a sprocket and chain drive 12 between said wheel and a short jack shaft 13 disposed parallel to and adjacent the shaft 11, and mounted on short longitudinal stringers 14 or the like. Speed increasing gearing 15 is interposed between the shafts 11 and 13, in order to increase the speed of the shaft 11, and consequently the mower elements, to the desired and necessary degree.

To insure that the wheel 2 will have sufficient traction when turning to drive the mower elements, I preferably arrange cleats 16 about the same.

To brace the mowers against deflection longitudinally of the machine, I mount a transverse beam 17 on the beams 1 which projects between and outwardly of the front and rear wheels. On the outer ends of this beam are fixed rigid brace straps 18, which extend downwardly outside the front wheels to connections with the mower elements adjacent their lower ends.

The mowers are preferably spaced apart a distance sufficient to include two rows of vines therebetween, but of course this spacing would vary according to the operative cutting width of the horizontal cutter to which the attachment is applied. The vines between the lines of severance pass between the mowers, and are then cut off close to the ground by the horizontal cutter 4, and are then in condition to be acted on by the rake teeth, which are lowered to the ground at predetermined intervals, and of course while in that position act to rake up the vines into piles until said teeth are again raised at the option of the operator.

When the rake teeth are again lowered to start another pile, some of the vines of the previously formed pile will be dragged along, causing a partial disintegration of said previous pile, unless some means is provided to positively sever the vines between the pile already made and that about to be formed. This I accomplish in the following manner: Mounted on the member 6 beyond the teeth 7 are rigid arms 19, substantially following the curvature of the teeth for about half their length.

Pivoted on the outer ends of said arms and depending downwardly therefrom to the rear of the teeth are hangers 20 which are connected at their lower ends by a transverse blade 21 whose cutting edge faces downwardly. This blade is so disposed relative to the rake teeth that when the latter are lowered to a raking position, the blade will engage the vines on the ground just behind the teeth and at a forward angle with the ground. Since the teeth drop of their own weight, which weight is now added to by the blade attached thereto, the momentum attained by said blade when it reaches the ground is sufficient to cause any vines thereunder to be positively cut through, thus separating the vines of adjacent piles.

It must be noted that in devices of this character, in which the rake teeth are of the usual curved form, that the lower portions of said teeth when lowered to the ground lie practically in a horizontal position with their points facing forwardly. The cutting edge of the blade is therefore disposed relative to said lower portions of the teeth as to be practically in horizontal alinement therewith when said teeth are lowered as above stated.

To permit the blade yielding and swinging back without forcibly dragging along the ground after said blade has functioned and without disturbing the rakes, I provide an extension 20ª on one of the hangers 20 above the pivot thereof. A rod 22 is attached at one end to the bar 6 and at its other end slidable through the upper end of the member 20ª, has a compression spring 23 thereon, which tends to force the blade 21 toward the teeth but of course allows the blade to yield in the opposite direction.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a bean vine cutter, a rake, means for alternately lowering and raising the rake, whereby to engage and form spaced piles of the vines, and means arranged in direct connection with the rake and operating automatically for causing the vines as they are initially engaged by the rake to be severed from those to the rear of the rake.

2. In a bean vine cutter, a rake means for alternately lowering and raising the rake, whereby to form spaced piles of the vines, and means arranged in connection with said rake whereby as the rake is lowered any vines extending along the ground from the previous pile will be cut through and severed from the vines forming the subsequent pile.

3. In a bean vine cutter, a rake, means for alternately lowering and raising the rake, whereby to form spaced piles of the vines, and a transverse blade having a downwardly facing cutting edge mounted behind and in conjunction with the rake and adapted to engage the ground when said rake is lowered.

4. In a bean vine cutter, a rake, means for alternately lowering and raising the rake, whereby to form spaced piles of the vines, and a transverse blade having a downwardly facing cutting edge mounted behind and in conjunction with the rake and adapted to engage the ground at a forward angle therewith when the rake is lowered, and yieldable means supporting said blade in a manner to enable the blade to swing back from said forward angle after it has once engaged the ground.

5. In a bean vine cutter, a rake, means for alternately lowering and raising the rake, whereby to form spaced piles of the vines, rigid arms mounted in connection with the rake and extending rearwardly thereof, hangers pivoted on the rear ends of the arms and depending therefrom behind the rake, a blade having a downwardly facing cutting edge extending between the hangers, and yieldable means mounted in connection with the rake and attached to one of the hangers for enabling the blade to yield in one direction.

6. In a bean vine cutter, a frame supported from the ground, a rake, said rake comprising a horizontal beam turnably mounted on the frame and teeth projecting rearwardly from the beam, means for alternately raising and lowering the rake, rigid arms mounted on the beam and projecting rearwardly of the teeth, hangers pivoted onto the rear ends of the arms, a blade having a downwardly facing cutting edge fixed on and extending between the hangers, and spring means acting on the blade to cause the latter, when the rake is lowered, to engage the ground at a forward angle while allowing said blade to then swing rearwardly about the connections of the hangers with the arms as an axis.

In testimony whereof I affix my signature.

JOHN C. TOWLER.